Aug. 21, 1951     G. E. FLINN     2,565,214
TRANSMISSION CONTROL SYSTEM
Filed Jan. 9, 1946
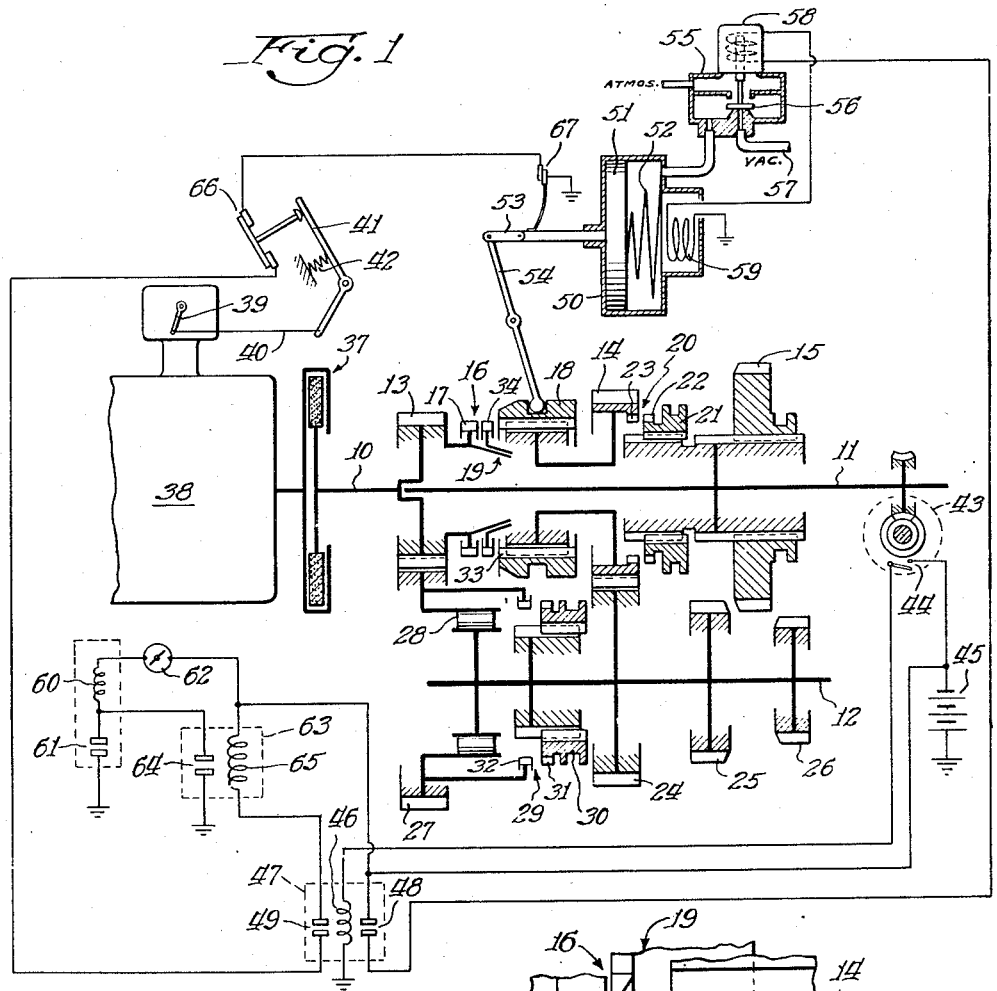
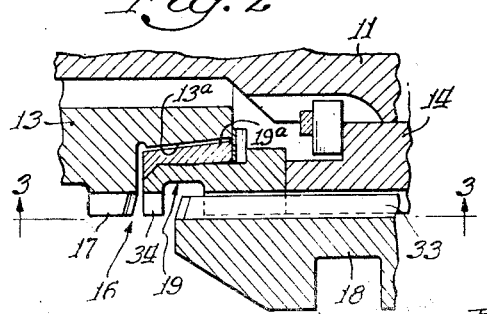
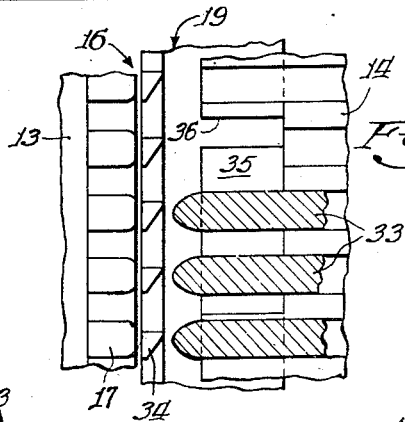
Inventor:
George E. Flinn Patented Aug. 21, 1951

2,565,214

UNITED STATES PATENT OFFICE 2,565,214

TRANSMISSION CONTROL SYSTEM

George E. Flinn, Muncie, Ind., assignor to Borg-Warner Corporation, Chicago, Ill., a corporation of Illinois Application January 9, 1946, Serial No. 639,940

10 Claims. (Cl. 74—472)

My invention relates to transmissions for automotive vehicles and more particularly to control mechanism for such transmissions.

Transmissions for automotive vehicles have been provided in the past which are under the control of the vehicle accelerator so that an upshift or a change from a low to a high speed ratio is obtained by simply allowing the accelerator to move into its closed throttle position. Such transmissions commonly include a positive type coupling for completing the high speed power train and a blocker for preventing an engagement of the positive coupling until the engaging parts of the coupling are synchronized in speed. Positioning the accelerator in its closed throttle position has the effect of allowing the engine of the vehicle to decrease in speed, and after a period of time, such reduction in speed causes the engageable parts of the positive coupling to synchronize whereupon the positive coupling engages to complete the high speed power train.

It has been found that the period of time for synchronization and engagement of the engageable parts of the positive coupling is unduly long, and it is an object of the present invention to reduce this time of synchronization and engagement for hastening the upshift from the low to the high speed ratio.

More particularly it is an object of the invention to hasten the upshift by disabling the automotive engine when the upshift is occurring whereby the speed of the engine drops more quickly than if the engine were allowed to remain operative even with the accelerator in its closed throttle or engine idling position. Still more particularly it is an object to disable the ignition system of the engine when the accelerator is moved to its closed throttle position to initiate an upshift in order to hasten the upshift. It is contemplated also that a driven shaft governor shall preferably be utilized and shall be so connected with the shift mechanism that an upshift can only occur above a predetermined speed of the driven shaft.

The invention consists of the novel constructions, arrangements and devices to be hereinafter described and claimed for carrying out the above stated objects and such other objects as will appear from the following description of a certain preferred embodiment illustrated in the accompanying drawing, wherein:

Fig. 1 is a diagrammatic illustration of an automatic transmission and control mechanism therefor embodying the principles of the invention;

Fig. 2 is a fragmentary longitudinal sectional view of the positive coupling and blocker therefor for completing the high speed power train in the transmission illustrated in Fig. 1; and Fig. 3 is a developed sectional view of the positive coupling and blocker taken on line 3—3 of Fig. 2.

Like characters of reference designate like parts in the several views.

Referring now to the drawing, it will be seen that the illustrated transmission comprises a drive shaft 10, a driven shaft 11 and a countershaft 12. A gear 13 is fixed to the shaft 10; a gear 14 is rotatably disposed on the shaft 11; and a gear 15 is slidably splined on the shaft 11, as shown. A positive clutch or coupling 16 is provided between the gear 14 and the gear 13, and this coupling comprises teeth 17 on the gear 13 and a clutch sleeve 18 slidably splined on the gear 14 and adapted to engage with the teeth 17. A blocker 19 is provided between the clutch sleeve 18 and teeth 17, as shown. The clutch 16 and the blocker 19 will hereinafter be more fully described with reference to Figs. 2 and 3. A positive clutch 20 is provided between the gear 14 and the shaft 11 and comprises a collar 21 splined to the shaft 11 and having teeth 22 adapted to interengage with teeth 23 formed on the gear 14.

Gears 24, 25 and 26 are fixed on the countershaft 12. The gear 24 is always in mesh with the gear 14, and the gear 15 is adapted to be moved along the shaft 11 to engage with the gear 25. The gear 15 may also be made to provide a power train with the countershaft gear 26 by moving the gear 15 in the opposite direction to mesh with an idler gear (not shown) which is also in mesh with the gear 26. A gear 27 in mesh with the gear 13 is disposed on the countershaft 12 by means of a one-way roller clutch 28 of the usual well-known construction. A positive clutch 29 is provided in parallel with the one-way clutch 28 for locking it up, and the positive clutch comprises a clutch collar 30 slidably splined on the shaft 12 and having teeth 31 which are adapted to interengage with teeth 32 formed on the gear 27.

Three forward speed ratios and a reverse drive are provided by the illustrated gearing. The gear 15 is shifted into mesh with the gear 25 to provide a low speed drive, and the power train is from the shaft 10 through the gears 13 and 27 and the one-way clutch 28 to the countershaft 12 and thence through the gears 25 and 15 to the shaft 11. The gear 15 is disengaged from the gear 25 and the positive clutch 20 is engaged to provide a second or intermediate speed power train between the shafts. The second speed power train is the same as that for low speed drive except that it proceeds through the gears 24 and 14 and the clutch 20 instead of through the gears 25 and 15. For direct drive or high speed ratio, the clutch 16 is engaged, and the drive is from the shaft 10 through the clutch 16, the gear 14 and the clutch 20 to the shaft 11. In direct drive, the one-way clutch 28 overruns. The clutches 20 and 16 are disengaged and the gear 15 is engaged with the idler (not shown) which is in mesh with the gear 26 to provide reverse drive. The power train in reverse is the same as in low speed forward drive with the exception that it proceeds through the idler gear and the gear 26 instead of the gear 25.

Referring particularly to Figs. 2 and 3, it will be seen that the positive clutch 16 and blocker mechanism associated therewith comprise teeth 33 formed within the clutch sleeve 18 and teeth 34 formed on the blocker 19. The sleeve 18 by means of its teeth 33 is splined to the gear 14 and engages the teeth 17 when the clutch 16 is engaged. The blocker is provided with lugs 35 which fit within slots 36 provided in the gear 14, and as shown, the slots 36 are of greater length than the lugs 35 so that the blocker may have a limited oscillatory movement with respect to the gear 14. At one limit of the movement of the blocker 19 in which the blocker is illustrated in Fig. 3, the blocker teeth 34 are in line with the teeth 33 of the coupling sleeve 18 and the teeth 34 prevent interengaging movement of the coupling sleeve 18 toward the teeth 17 on the gear 13. At the other limit of its oscillatory movement, the blocker 19 is positioned to have its teeth 34 between the teeth 33 so that the teeth 33 may pass through the teeth 34 and the sleeve 18 may complete its engaging movement toward the teeth 17 on the gear 13.

The gear 13 has a friction surface 13a and the blocker 19 has a friction surface 19a which are adapted to contact. By means of the friction surface 19a the blocker 19 is oscillated in the direction of rotation of the gear 13, and while the gear 13 is turning faster than the gear 14, the blocker 19 has its teeth 34 in blocking position as they are shown in Fig. 3. The friction surfaces 13a and 19a also function to synchronize the speeds of the gears 13 and 14, and when the speed of the gear 13 drops slightly below the speed of the gear 14, the frictional contact of the surfaces 19a and 13a will function to oscillate the blocker 19 into its position permitting complete engagement of the teeth 33 on the coupling sleeve 18 with the teeth 17 on the gear 13.

The drive shaft 10 is connected through a friction clutch 37 with the engine 38 of the automotive vehicle in which the transmission is installed. The clutch 37 may be of any suitable type, and the engine 38 may be of the usual internal combustion type. The engine has a throttle 39 which is connected by any suitable linkage 40 with the accelerator 41 of the vehicle. The accelerator is acted on by a spring 42 for returning the accelerator to its closed throttle position. The accelerator is utilized both for opening and closing the throttle 39 and also for automatically upshifting the transmission from its intermediate speed ratio to its high speed ratio when the accelerator is released to allow it to return to its closed throttle position and when the speed of the driven shaft 11 and thereby of the vehicle are above predetermined values, as will hereinafter be more fully described.

The control mechanism for the transmission comprises a governor 43 driven by the shaft 11 of the transmission. The governor may be of any suitable construction and comprises an electric switch 44 which closes at a predetermined speed of the driven shaft 11 and remains closed above that speed. The governor 43 so conditions the control mechanism for the transmission above the critical governor speed at which the switch 44 closes that the clutch collar 18 of the clutch 16 may be shifted into its direct drive position and the ignition system of the engine 38 may be disabled in order to increase the speed at which the shift is made when the accelerator 41 is allowed to move to its closed throttle position. This will be apparent from an understanding of the details of the control mechanism given below.

The governor switch 44 is connected to one terminal of the battery 45 of the automotive vehicle which is grounded at its opposite terminal. The governor switch 44 is also connected with the winding 46 of an electric relay 47, and the winding 46 is also grounded as shown. The relay 47 comprises relay contacts 48 and 49. The relay contacts 48 are connected to control movement of the clutch collar 18 and the relay contacts 49 are connected to disable the ignition system of the engine 38 when closed, as will hereinafter be made apparent.

The clutch collar 18 is shifted by means of a vacuum motor 50. The motor 50 comprises a piston 51 acted on by a spring 52 and connected by linkage 53 and a lever 54 with the collar 18. A valve 55 having a movable plunger 56 is provided for either connecting the motor 50 with the atmosphere, as in the illustrated position of the plunger 56, or with a vacuum line 57 connected with any suitable source of vacuum, such as the manifold of the engine 38. The valve 55 comprises an electric solenoid 58 which when energized moves the valve plunger 56 upwardly to make the connection between the motor 50 and the vacuum line 57. The motor 50 comprises also an electric holding coil 59 which is grounded at one end, and which functions when energized to hold the piston 51 at the limit of its movement against the spring 52 after it has been so moved by vacuum applied thereto through the valve 55, and the piston is held in such position by the holding coil regardless of fluctuation in the vacuum which might occur when the throttle 39 of the engine is opened. The electric solenoid 58 is connected in series with the holding coil 59 and is also connected with one of the relay contacts 48, the other relay contact being connected, as shown, with the battery 45.

The ignition system for the internal combustion engine 38 comprises the usual spark coil 60 and circuit breaker 61. The coil and circuit breaker are connected in series and the breaker is also grounded, as shown. The spark coil is connected with the battery 45 through the usual ignition switch 62.

An electric relay 63 is provided for establishing, on occasion, a short circuit around the circuit breaker 61. The relay 63 comprises relay contacts 64 one of which is grounded and the other of which is connected between the spark coil and the circuit breaker for establishing this short circuit. The relay 63 comprises also a relay winding 65 connected at one end to the battery 45 through much of the same circuit as the ignition switch 62 is connected with the battery. The winding 65 on its other end is connected with one of the contacts 49 of the relay 47, as shown.

A switch 66 is provided which is actuated by the accelerator 41, the switch being in closed condition when the accelerator is in closed throttle position. The switch 66 is connected in series with one of the contacts 49 and is also connected in series with a switch 67. The switch 67 is provided on the linkage 53 actuated by the piston 51 of the vacuum motor 50, and one of the contacts of the switch 67 is grounded as shown. The switch 67 is closed in its illustrated condition with the piston 51 being in its position corresponding to disengaged condition of the direct drive clutch 16, and the switch 67 is opened when the piston 51 is in its position corresponding to closed condition of the direct drive clutch 16.

In the operation of the illustrated transmission and control mechanism, the transmission is shifted into either low speed forward or into reverse drive by moving the gear 15 in one direction or the other along the shaft 11 to mesh either with the gear 25 or the idler gear (not shown) in mesh with the gear 26 while the clutch 37 is disengaged. The transmission is shifted into intermediate speed forward by engaging the clutch 20, with the gear 15 being in its neutral position in which it is illustrated, while the clutch 37 is disengaged. While the transmission is in second or intermediate speed, it may be shifted into high speed ratio or direct drive simply by allowing the accelerator 41 to move into its closed throttle position in which it is illustrated, assuming that the speeds of the vehicle and shaft 11 are high enough. This shift into high speed drive may be made with the clutch 37 remaining engaged.

The switch 44 of the governor 43 closes at the critical speed of the governor 43, and this switch thus completes a circuit from the battery 45 to the winding 46 of the relay 47, and the relay is energized. The contacts 48 and 49 of the relay are thus closed, and the contacts 48 complete a circuit from the battery 45 through the solenoid 58 of the vacuum valve 55 and through the holding coil 59 of the vacuum motor 50. Energization of the solenoid 58 moves the valve plunger 56 into its position in which it connects the vacuum motor 50 with the vacuum line 57, and vacuum is thereafter effective on the motor piston 51 so as to tend to move the clutch sleeve 18 toward its direct drive position. Due to the fact, however, that the gear 13 is rotating faster than the clutch sleeve 18 when second speed drive is effective through the transmission, the blocker 19 is effective to prevent any movement of the clutch sleeve 18 into engaged position. This condition obtains until the accelerator 41 is released allowing it to move back into its closed throttle position.

Movement of the accelerator 41 into its closed throttle position has the effect of slowing down the speed of the engine 38 and of the drive shaft 10 and gear 13, until finally the speed of the gear 13 drops slightly below the speed of the gear 14, and the blocker 19 is thus moved out of blocking position. The clutch sleeve 18 thereafter moves into its engaged position interengaging its teeth with the teeth 17 with a corresponding movement of the piston 51 thereby putting the transmission in direct drive. Such movement of the clutch sleeve 18 and the piston 51 is, as has been described, under the influence of the vacuum in the line 57 and against the action of the spring 52. The clutch sleeve 18 and piston 51 remain in their changed positions corresponding to direct drive as long as the speed of the shaft 11 remains above the critical governor speed, and the holding coil 59 is effective for holding the piston 51 in its direct drive position regardless of any fluctuation of vacuum in the line 57 due to opening and closing of the throttle 39 as the vehicle is driven in direct drive.

In order to hasten the change from second speed drive to direct drive after the accelerator 41 is released, the ignition disabling system comprising the relay 63 and the relay contacts 49 of the relay 47 is provided. The contacts 49 of the relay 47 are closed, as has been described, when the governor switch 44 closes, and the ignition disrupting circuit is thus conditioned for operation. The contacts 49 are in series with the accelerator switch 66, and when the latter switch is closed on a release of the accelerator, an electric circuit is completed through the relay winding 65, the contacts 49, the switch 66 and the switch 67. The relay 63 is thus energized and closes the contacts 64 of the relay to short circuit the circuit breaker 61 and thus disable the ignition system of the engine 38 causing the engine to "miss." The speed of the engine 38 and of the shaft 10 and gear 13 thus drop more quickly than would be the case if the engine were simply put into idling condition without being made inoperative to cause the shift, and the shift is thus made more quickly. The switch 67 remains closed until the sleeve 18 of the direct drive clutch 16 is moved past the blocker and into engagement with the teeth 17, and the engine thus "misses" until the shift into direct drive is fully made. When, however, the clutch sleeve 18 does shift into fully engaged position, the switch 67 opens and breaks the circuit through the winding 65 of the relay 63, and the latter relay is deenergized and the relay contacts 64 open. The ignition is thus returned to its original operative condition, and the engine 38 then resumes driving.

My improved transmission control mechanism advantageously functions with respect to an upshift requiring the synchronization of one shaft rotating with the driven shaft of the transmission and another shaft rotating with the engine of the vehicle to hasten the upshift by disabling the ignition system of the engine momentarily while the shift is being made. The engine ignition disabling mechanism is effective only on the accelerator switch being in its closed condition due to the accelerator being moved to its closed throttle position, and the shifting mechanism may be operative at all times after the driven shaft has exceeded the critical governor speed by such movement of the accelerator.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism, the combination of a drive shaft, a driven shaft, an engine for driving said drive shaft, an accelerator for said engine, means for providing a high speed ratio between said shafts, means for providing a low speed ratio between said shafts, means for shifting the transmission mechanism from low speed ratio to high speed ratio and including means under the control of said accelerator for initiating the shift when the accelerator is moved to its throttle closing position, and means under the control of said accelerator for disabling said engine when said shifting means is operative and the accelerator is so moved to its throttle closing position to shift from low speed ratio to high speed ratio for hastening the shift.

2. In transmission mechanism, the combination of a drive shaft, a driven shaft, an engine for driving said drive shaft and having an ignition system, an accelerator for said engine, means for providing a high speed ratio between said shafts, means for providing a low speed ratio between said shafts, means for shifting the transmission mechanism from low speed ratio to high speed ratio and including means under the control of said accelerator for initiating the shift when the accelerator is moved into its throttle closing position, and means under the control of said accelerator for disabling said ignition system when said shifting means is operative and the accelerator is so moved into throttle closing position to shift from low speed ratio to high speed ratio.

3. In transmission mechanism, the combination of a drive shaft, a driven shaft, an engine for driving said drive shaft, an accelerator for said engine, means for providing a low speed ratio between said shafts, means for providing a high speed ratio between said shafts and including a positive coupling for completing the high speed ratio, a blocker for preventing engagement of said positive coupling prior to synchronization of the engaging parts thereof, means for shifting the transmission mechanism from low speed ratio to high speed ratio and including means under the control of said accelerator for initiating the shift when the accelerator is moved into throttle closing position, and means under the control of said accelerator for disabling said engine when said shifting means is operative and the accelerator is so moved into throttle closing position to shift from low speed ratio to high speed ratio.

4. In transmission mechanism, the combination of a drive shaft, a driven shaft, an engine for driving said drive shaft and having an ignition system, an accelerator for said engine, means for providing a low speed ratio between said shafts, means for providing a high speed ratio between said shafts and including a positive coupling for completing the high speed ratio, a blocker for preventing engagement of said positive coupling prior to synchronization of the engaging parts of the positive coupling, means for shifting the transmission mechanism from low speed ratio to high speed ratio and including means under the control of said accelerator for initiating the shift when the accelerator is moved into throttle closing position, and means under the control of said accelerator for disabling said engine ignition system when said shifting means is operative and the accelerator is so moved into throttle closing position to shift from low speed ratio to high speed ratio.

5. In transmission mechanism, the combination of a drive shaft, a driven shaft, an engine for driving said drive shaft, an accelerator for said engine, means for providing a high speed ratio between said shafts, means for providing a low speed ratio between said shafts, a governor responsive to the speed of said driven shaft, means under the control of said accelerator and governor for shifting the transmission mechanism from low speed ratio to high speed ratio when the accelerator is put into throttle closing position and the speed of the driven shaft is above a predetermined value, and means under the control of said accelerator for disabling said engine when said shifting means is operative and the accelerator is so moved to shift the transmission mechanism from low speed ratio to high speed ratio.

6. In transmission mechanism, the combination of a drive shaft, a driven shaft, an engine for driving said drive shaft and having an ignition system, an accelerator for said engine, means for providing a high speed ratio between said shafts, means for providing a low speed ratio between said shafts, a governor responsive to the speed of said driven shaft, means under the control of said accelerator and said governor for shifting the transmission mechanism from low speed ratio to high speed ratio when the accelerator is moved into throttle closing position and the speed of said driven shaft is above a predetermined value, and means under the control of said accelerator for disabling said ignition system when said shifting means is operative and the accelerator is so moved into throttle closing position to shift from low speed ratio to high speed ratio.

7. In transmission mechanism, the combination of a drive shaft, a driven shaft, an engine for driving said drive shaft and having an ignition system, an accelerator for said engine, means for providing a low speed ratio between said shafts, means for providing a high speed ratio between said shafts and including a positive coupling for completing the high speed ratio, a blocker for preventing engagement of said positive coupling prior to synchronization of the engaging parts of said coupling, a governor responsive to the speed of said driven shaft, means under the control of said accelerator and said governor for engaging said coupling for shifting the transmission mechanism from low speed ratio to high speed ratio when the accelerator is moved into throttle closing position and the speed of said driven shaft is above a predetermined value, and means under the control of said accelerator for disabling said engine ignition system when said shifting means is operative and the accelerator is so moved into throttle closing position for shifting from low speed ratio to high speed ratio.

8. In transmission mechanism, the combination of a drive shaft, a driven shaft, an engine for driving said drive shaft and having an ignition system, an accelerator for said engine, means for providing a high speed ratio between said shafts, means for providing a low speed ratio between said shafts, means for shifting the transmission mechanism from low speed ratio to high speed ratio and including means under the control of said accelerator for initiating the shift when the accelerator is put into throttle closing position, and means under the control of said accelerator for disabling said ignition system when said shifting means is operative and the accelerator is so moved into throttle closing position to shift from low speed ratio to high speed ratio and including an electric switch actuated by the accelerator and put into changed electrical condition when the accelerator is moved into its throttle closing position.

9. In transmission mechanism, the combination of a drive shaft, a driven shaft, an engine for driving said drive shaft and having an ignition system, an accelerator for said engine, means for providing a low speed ratio between said shafts, means for providing a high speed ratio between said shafts and including a positive coupling for completing the high speed power train, a blocker for preventing engagement of said positive coupling prior to synchronization of the engaging parts thereof, means for engaging said coupling to shift the transmission mechanism from low speed ratio to high speed ratio and including means under the control of said accelerator for initiating the shift when the accelerator is put into throttle closing position, and means under the control of said accelerator for disabling said engine ignition system when said shifting means is operative and the accelerator is so moved into throttle closing position to shift from low speed ratio to high speed ratio and including a switch actuated by the accelerator and closed when the accelerator is in its throttle closing position.

10. In transmission mechanism, the combination of a drive shaft, a driven shaft, an engine for driving said drive shaft and having an ignition system, an accelerator for said engine, means for providing a low speed ratio between said shafts, means for providing a high speed ratio between said shafts and including a positive coupling for completing the high speed ratio, a blocker for preventing engagement of said coupling prior to synchronization of the engaging parts thereof, a governor driven by said driven shaft, means under the control of said governor and said accelerator for engaging said coupling and thereby shifting the transmission mechanism from low speed ratio to high speed ratio when the accelerator is put into throttle closing position and the speed of said driven shaft is above a predetermined value, and means under the control of said accelerator for disabling said engine ignition system when said shifting means is operative and the accelerator is so moved into throttle closing position to shift from low speed ratio to high speed ratio and including an accelerator actuated switch which is closed when the accelerator is in its throttle closing position.

GEORGE E. FLINN.

REFERENCES CITED

The following references are of record in the file of this patent:

UNITED STATES PATENTS

| Number | Name | Date |
|---|---|---|
| 2,257,674 | Dunn | Sept. 30, 1941 |
| 2,373,902 | Matulaitis | Apr. 17, 1945 |
| 2,387,891 | Elkin | Oct. 30, 1945 |